(12) United States Patent
Liu et al.

(10) Patent No.: US 11,314,008 B2
(45) Date of Patent: Apr. 26, 2022

(54) LIGHTGUIDE HAVING OPENING AND SURROUNDING CHANNEL

(71) Applicant: 3M INNOVATIVE PROPERTIES COMPANY, St. Paul, MN (US)

(72) Inventors: Tao Liu, Woodbury, MN (US); Yongshang Lu, Woodbury, MN (US); David C. Mercord, Prescott, WI (US); Brian W. Ostlie, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/629,595

(22) PCT Filed: Jul. 30, 2018

(86) PCT No.: PCT/IB2018/055673
§ 371 (c)(1),
(2) Date: Jan. 9, 2020

(87) PCT Pub. No.: WO2019/030607
PCT Pub. Date: Feb. 14, 2019

(65) Prior Publication Data
US 2021/0157044 A1    May 27, 2021

Related U.S. Application Data

(60) Provisional application No. 62/542,460, filed on Aug. 8, 2017.

(51) Int. Cl.
*F21V 8/00* (2006.01)

(52) U.S. Cl.
CPC .......... *G02B 6/002* (2013.01); *G02B 6/0028* (2013.01); *G02B 6/0036* (2013.01); *G02B 6/006* (2013.01)

(58) Field of Classification Search
CPC .... G02B 6/006; G02B 6/0036; G02B 6/0028; G02B 6/002
See application file for complete search history.

(56) References Cited

U.S. PATENT DOCUMENTS

| | | |
|---|---|---|
| 8,358,266 B2 | 1/2013 | Khazeni |
| 2008/0290784 A1 | 11/2008 | Arbab |
| 2009/0284836 A1 | 11/2009 | Boyd |

(Continued)

FOREIGN PATENT DOCUMENTS

| | | |
|---|---|---|
| EP | 1045262 | 10/2000 |
| JP | 2004-196585 | 7/2004 |

OTHER PUBLICATIONS

International Search Report for PCT International Application No. PCT/IB2018/055673, dated Dec. 21, 2018, 7pgs.

*Primary Examiner* — Karabi Guharay
(74) *Attorney, Agent, or Firm* — Jonathan L. Tolstedt

(57) ABSTRACT

An optical system includes a lightguide having opposing top and bottom major surfaces. A round through opening extends between the two surfaces of the lightguide. An elongated channel is formed in one of the surfaces and at least partially surrounds and is substantially concentric with the opening. The channel has a depth (d) that varies along its length. Light extractors extract light that would otherwise propagate within and along the lightguide. The features of the lightguide can be varied to optimize performance of the lightguide for various purposes.

10 Claims, 14 Drawing Sheets

(56) References Cited

U.S. PATENT DOCUMENTS

| | | |
|---|---|---|
| 2010/0008103 A1 | 1/2010 | Lee et al. |
| 2014/0063853 A1 | 3/2014 | Nichol |
| 2016/0377796 A1 | 12/2016 | Sherman |
| 2017/0075119 A1 | 3/2017 | Schultz et al. |
| 2018/0196185 A1* | 7/2018 | Shi ................. G02B 6/0078 |

* cited by examiner

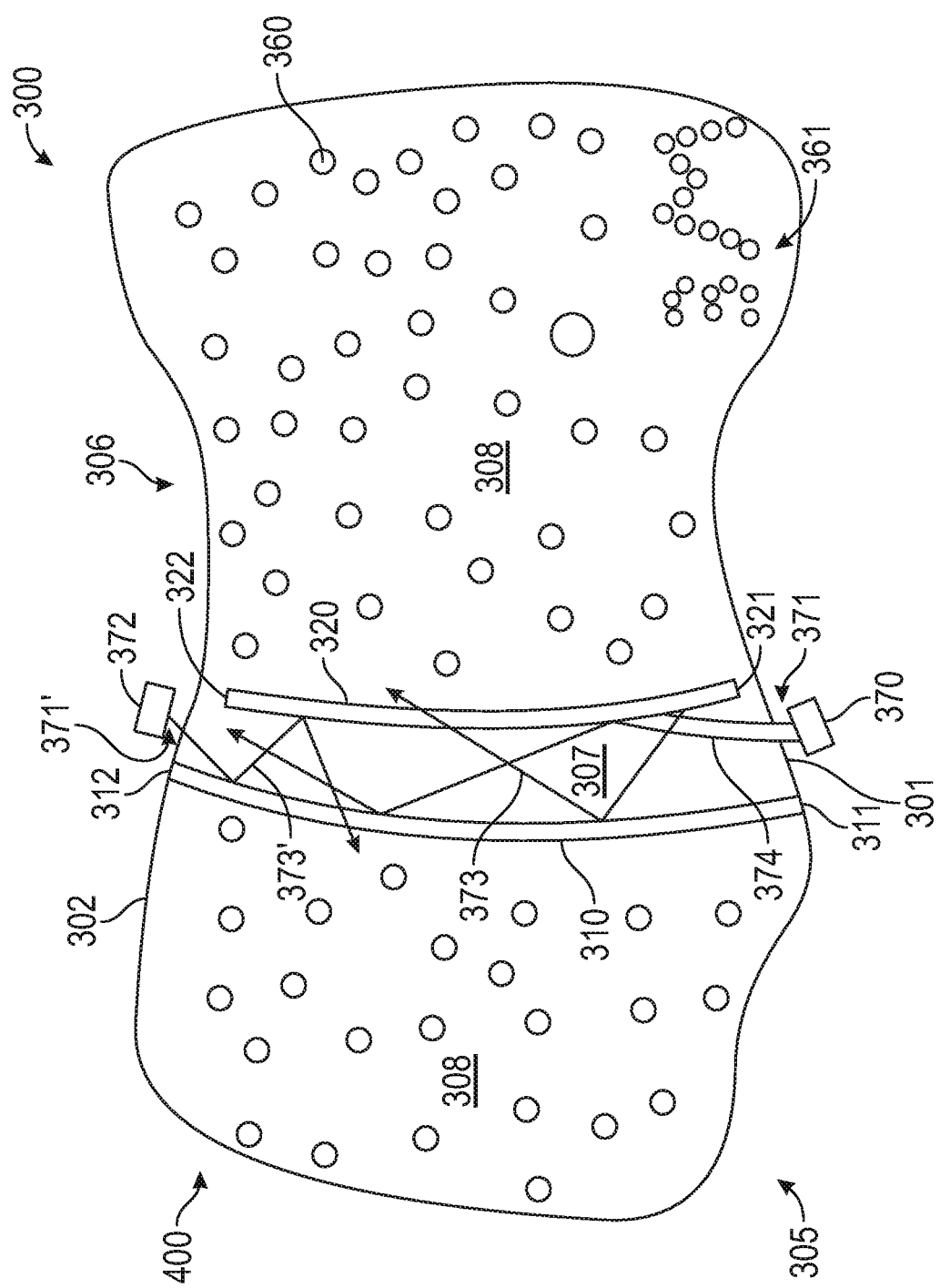

US 11,314,008 B2

LIGHTGUIDE HAVING OPENING AND SURROUNDING CHANNEL

TECHNICAL FIELD

This disclosure relates generally to lightguides.

BACKGROUND

Lightguides can be used to provide illumination for various applications. For example, lightguides have been used in display backlights, general lighting, and automotive tail lamps. A plurality of light sources may be distributed along an end of the lightguide to provide light into the lightguide, and the lightguide may include light extraction features for extracting the light from the lightguide.

Multiple light emitting diodes (LEDs) are typically arranged along one or two ends of the area lightguide for light injection. The number of LEDs and their spacing are typically determined by the total amount of light and spatial uniformity needed for a given application. The LEDs are typically installed directly adjacent to the lightguide and light is input into the lightguide via butt-coupling. Assembly of such systems can be complex, especially when using flexible lightguides, and the cost can be high due to the number of LEDs needed.

SUMMARY

The present invention includes an optical system comprising a lightguide. The lightguide includes opposing top and bottom major surfaces. A round through opening extends from the top major surface to the bottom major surface. An elongated first channel is formed in one of the two major surfaces and at least partially surrounds and is substantially concentric with the opening. The first channel has a depth (d) that varies along a length of the channel A plurality of light extractors extract light that would otherwise propagate within and along the lightguide.

The elongated first channel may be a closed loop channel or an open loop channel. The first channel may comprise opposite first and second channel ends, at least one of which is open. At least one of the two channel ends may be closed. Alternatively, both channel ends may be open or closed. The first channel extends between the channel ends.

The round through opening described above may be substantially circular. In one embodiment, no light extractor in the plurality of light extractors is disposed between the opening and the first channel.

The optical system may further include an optical fiber for injecting light into a region of the lightguide between the through opening and the first channel, where a first end of the optical fiber is disposed at an edge of the lightguide proximate a first end of the first channel. The optical system may further include a light source for injecting light into the optical fiber and disposed proximate a second end of the optical fiber opposite the first end of the optical fiber.

The optical system may further comprise a second channel formed in a major surface of the lightguide between the opening and the first channel for receiving at least an end of an optical fiber. An optical fiber may extend between opposite first and second fiber ends, where the first fiber end is disposed in the second channel A light source may be disposed proximate the second fiber end.

The lightguide may be substantially flat or it may be curved in at least one direction (y). The lightguide may have a cross-sectional profile along a length of the lightguide that is round, circular, elliptical, mushroom-shaped, polygonal, rectangular, or square.

At least some of the light extractors may form a pattern that comprises one or more of a letter, a text, a logo, an alphanumeric, a symbol, a picture, and an image. At least some of the light extractors are protrusions formed on an exterior surface of the lightguide. Also, at least some of the light extractors may be notches formed in an exterior surface of the lightguide.

The first channel may be formed in the top major surface and extend toward the bottom major surface. At at least one location along the length of the first channel, the channel may reach the bottom major surface. Alternatively, the first channel may be formed in the bottom major surface and extend toward the top major surface. The top major surface may be an emission surface of the light rays propagating within and along the lightguide. The light rays are extracted by at least one light extractor and exit the lightguide from the emission surface.

The first channel may have a first side surface facing the opening and an opposing second side surface facing away from the opening, at least one of the side surfaces making an angle with a normal to the lightguide that is less than about 20 or 30 degrees. At least one of the side surfaces may be substantially planar or curved.

The first channel may be substantially circular. The lightguide may have an index of refraction n1 and the first channel may be at least partially filled with a filler material having an index of refraction index n2 less than n1.

The depth (d) of the first channel may vary linearly or non-linearly along at least a portion of its length and may have a piece-wise profile along the length of the channel.

The present disclosure also includes a lightguide comprising substantially coextensive spaced apart first and second elongated channels. Each elongated channel extends from a first end of the channel proximate a same first edge of the lightguide to an opposing second end of the channel proximate a same second edge of the lightguide. The first and second edges may be on the same or opposite sides of the lightguide. One or both the channels may have a maximum depth (h1, h2) that is at least 0.5 times the thickness of the lightguide. Optionally, one, but not the other, of the two channels may extend from a first major surface of the lightguide to an opposing second major surface of the lightguide.

At least one of the two ends of at least one of the two channels may be closed or open. At least one of the two channels may extend from the first edge to the second edge. Alternatively, neither or both the channels may extend from the first edge to the second edge. The two ends of at least one of the two channels may be open or closed.

The lightguide may further include a plurality of light extractors for extracting light that would otherwise propagate within and along the lightguide. At least some of the light extractors may form a pattern that comprises one or more of a letter, a text, a logo, an alphanumeric, a symbol, a picture, and an image.

The two channels may define a first region of the lightguide between the two channels and a second region of the lightguide on at least one side of the two channels. When a light source is disposed at one of the two edges between the two channels, light emitted by the light source enters the first region from the one of the two edges. At least a first portion of the entered light propagating toward the other edge undergoes at least partial reflection at at least one of the two channels, and at least a second portion of the entered light propagating from the first region to the second region crosses underneath or above one of the channels.

The present disclosure also includes an optical system including a lightguide as described above, where the two channels define a first region of the lightguide therebetween. The system also includes a light source disposed at at least one of the two edges between the two channels. Light emitted by the light source enters the first region of the lightguide and propagates along the first region by undergoing at least partial reflection at the two channels. A light source may be disposed at each of the two edges between the two channels, such that light emitted by each light source enters the first region of the lightguide and propagates along the first region by undergoing reflection at the two channels.

The lightguide may be a unitary lightguide, as defined herein.

BRIEF DESCRIPTION OF THE DRAWINGS

FIGS. 13-15 are schematic top views of optical system 400 where light guide 300 has two spaced apart elongate channels according to various embodiments of the present disclosure;

The figures are not necessarily to scale. Like numbers used in the figures refer to like components. However, it will be understood that the use of a number to refer to a component in a given figure is not intended to limit the component in another figure labeled with the same number.

DESCRIPTION OF ILLUSTRATIVE EMBODIMENTS

Figure 1:
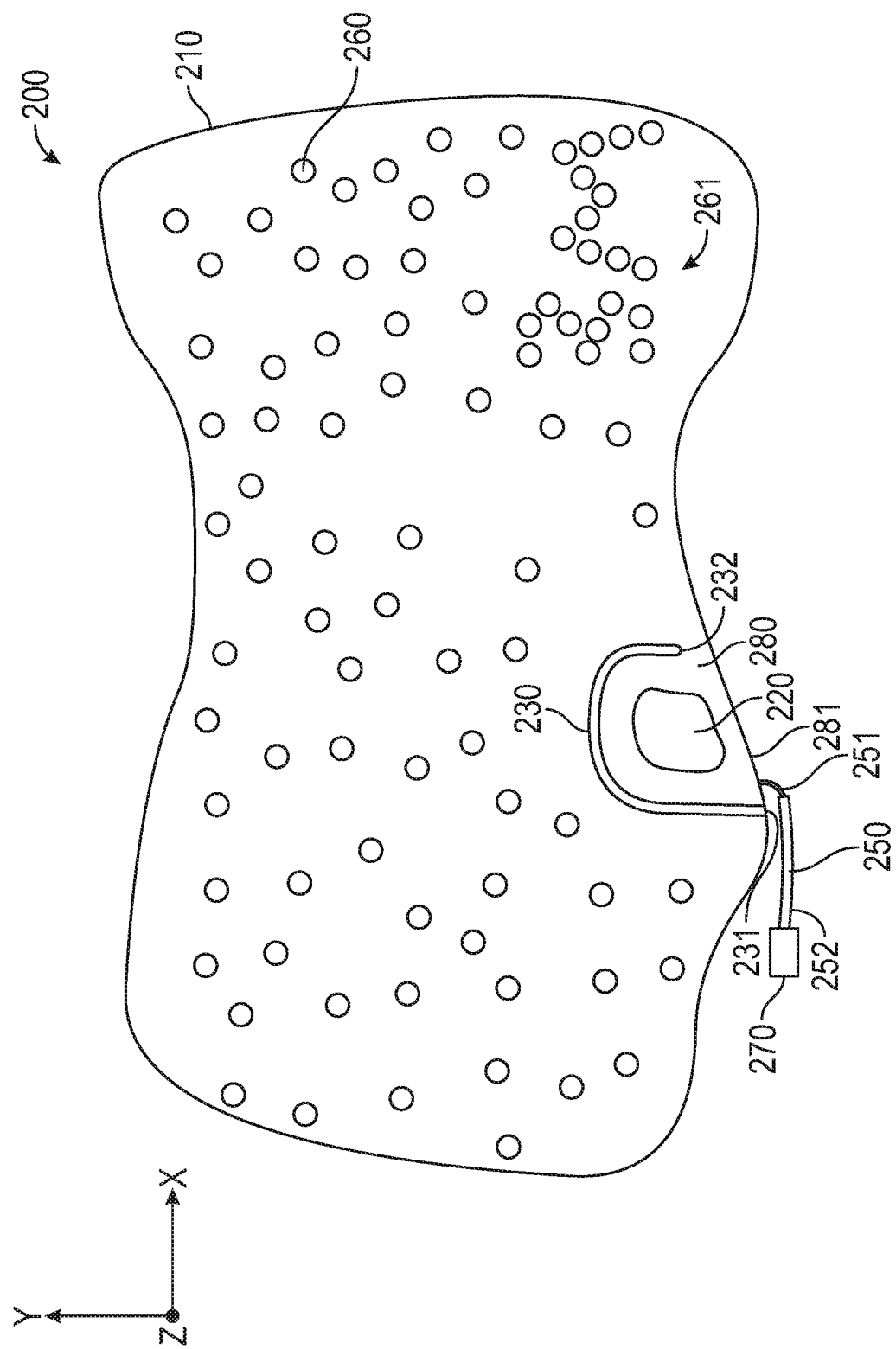
FIGS. 1-2 are schematic top views of optical system 200 having an open loop channel according to two embodiments of the present disclosure.
Figure 3:
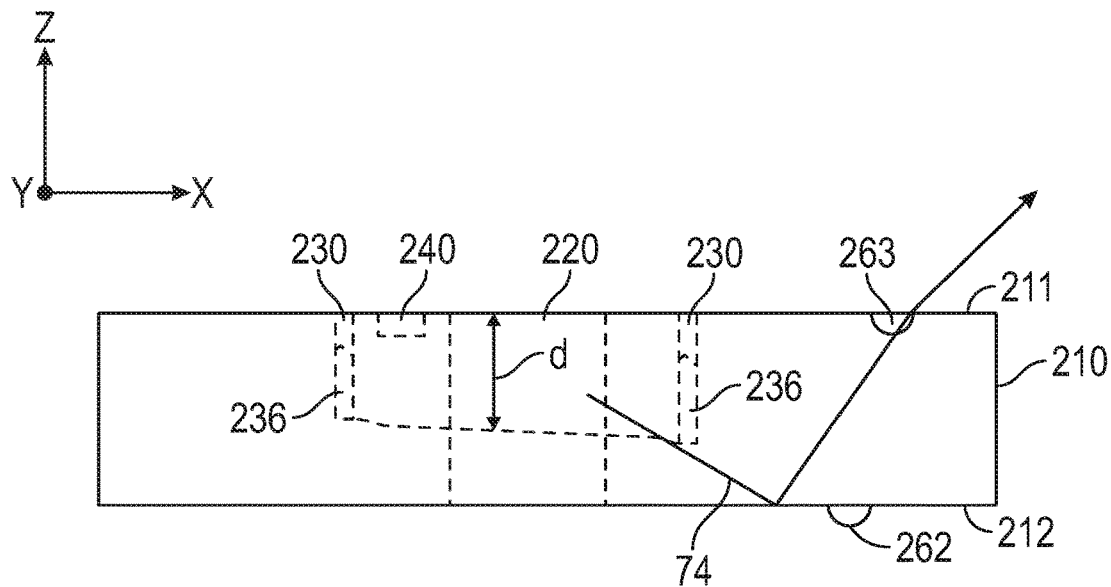
FIGS. 3-5 are schematic side views of lightguide 210 according to three embodiments of the present disclosure.

An optical system 200 including a lightguide 210 according to one embodiment of the present disclosure is shown in FIG. 1. 65. Lightguide 210 and the other lightguides described herein may be unitary or non-unitary. As used herein, the term "unitary lightguide" means a lightguide having a construction such that there are no discernible interfaces within the lightguide, such as no discernible interface between the main body of the lightguide and any of its features, such as light extractors 260 (described below). Lightguide 210 may be substantially flat. A round through opening 220 extends from top major surface 211 to bottom major surface 212, as also illustrated in FIG. 3. An elongated first channel 230 is formed in one of the top and bottom major surfaces 211 and 212 and at least partially surrounds and is substantially concentric with opening 220. First channel 230 has a depth (d) that varies along a length of the channel.

As shown in FIG. 1, lightguide 210 also includes a plurality of light extractors 260 for extracting light that would otherwise propagate within and along the lightguide. Generally, it may be desirable to not have any light extractors 260 disposed between opening 220 and first channel 230. Optionally, at least some of light extractors 260 may form a pattern 261 that includes one or more of a letter, a text, a logo, an alphanumeric, a symbol, a picture, and an image.

As shown in FIG. 1, first channel 230 may be an open loop channel having a first end 231 (shown as open) and a second end 232 (shown as closed).

Optical system 200 may further include an optical fiber 250 for injecting light into region 280 of lightguide 210 between through opening 220 and first channel 230. A first end 251 of optical fiber 250 is disposed at edge 281 of lightguide 210 proximate a first end 231 of first channel 230. Optical system 200 may further include a light source 270, for injecting light into optical fiber 250, disposed proximate a second end 252 of the optical fiber opposite first end 251 of the optical fiber.

Figure 2:
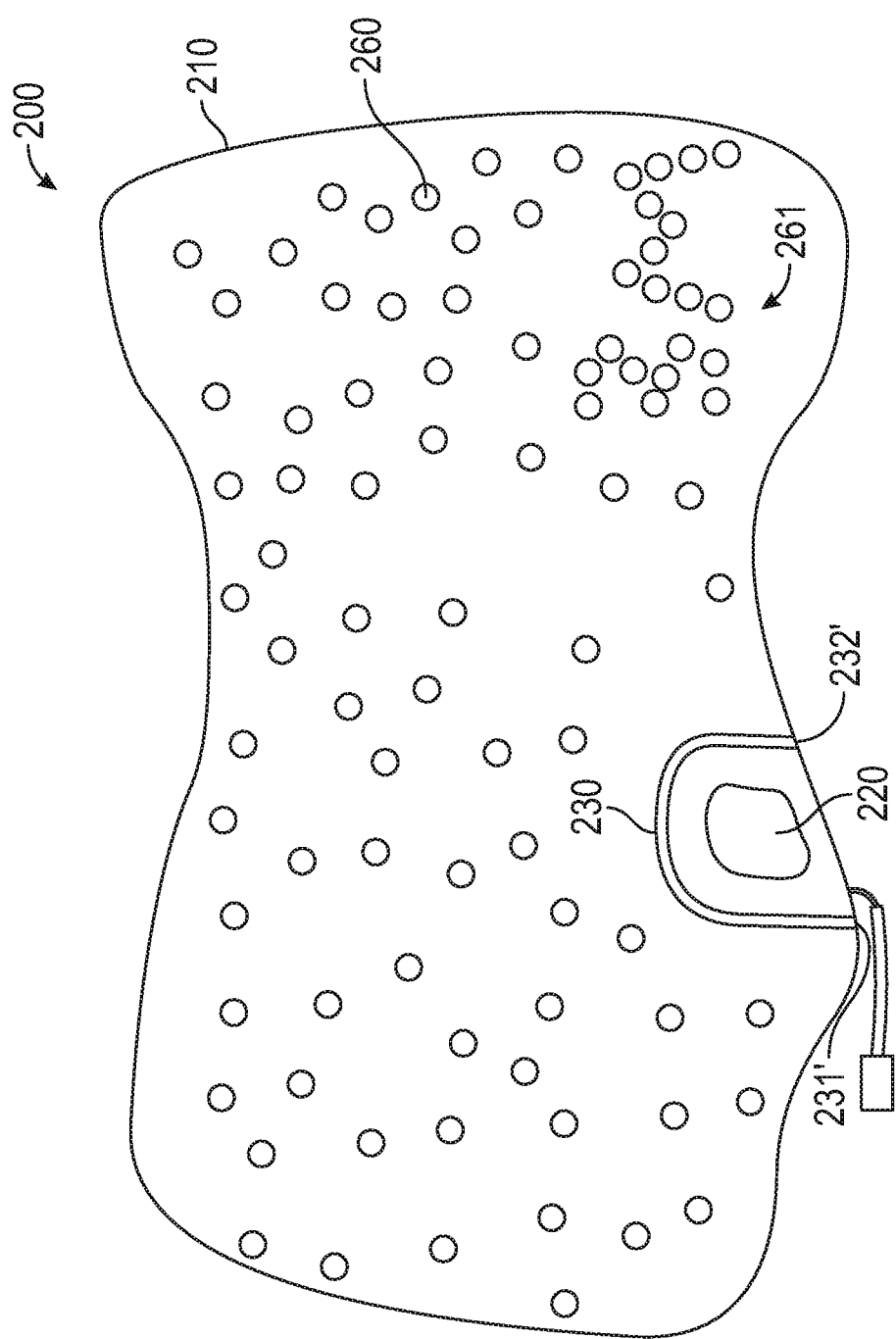

As shown in FIG. 2, first channel 230 may be an open loop where both channels ends 231' and 232' are open.

A side view of lightguide 210 is shown in FIG. 3. Some of light extractors 260 may be protrusions 262 formed on bottom major surface 212 of lightguide 210. Some of light extractors 260 may be notches 263 formed in top major surface 211 of lightguide 210. (As illustrated throughout the Figures, protrusions 262 and notches 263 may be formed on either or both major surfaces 211 and 212.) First channel 230 may be formed in top surface 211 and extends toward bottom surface 212. As illustrated in FIG. 3, top surface 211 may be an emission surface of lightguide 210. Light rays 74 propagating within and along lightguide 210 are extracted by notch 263 and exit the lightguide at top surface 211.

First channel 230 may be at least partially filled with a filler material 236. The refractive index n2 of filler material 236 should be less than the index of refraction n1 of lightguide 210.

Figure 4:
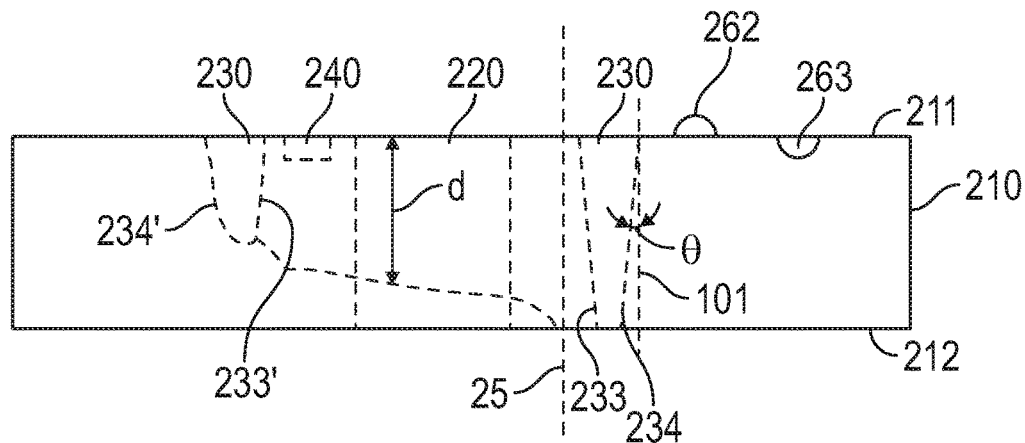

As shown in FIG. 4, first channel 230 may have a first side surface 233 facing opening 220 and an opposing second side surface 234 facing away from the opening. At least one of side surfaces 233 and 234 make an angle θ with a normal 101 to lightguide 210 that is less than about 30 degrees, or less than about 20 degrees. At least one of side surfaces 233 and 234 may be substantially planar.

Alternatively, first channel 230 may have a first side surface 233' facing opening 220 and an opposing second side surface 234' facing away from the opening. At least one of side surfaces 233' and 234' may be curved.

The depth d of first channel 230 may vary along its length. In FIG. 4, the depth d of first channel 230 is shown as becoming deeper as viewed from left to right along the length of the first channel as it extends from its first end (e.g., 231 or 231') to its second end (e.g., 232 or 232'). Optionally, at at least one location 25 along the length of first channel 230, the first channel may reach bottom major surface 212, as shown in FIG. 4.

Figure 5:
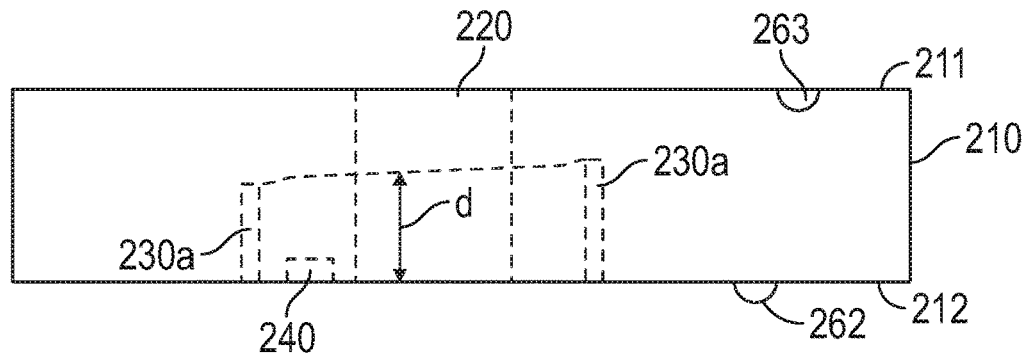

As shown in FIG. 5, first channel 230a may be formed in bottom major surface 212 and extend toward top major surface 211.

Figure 6:
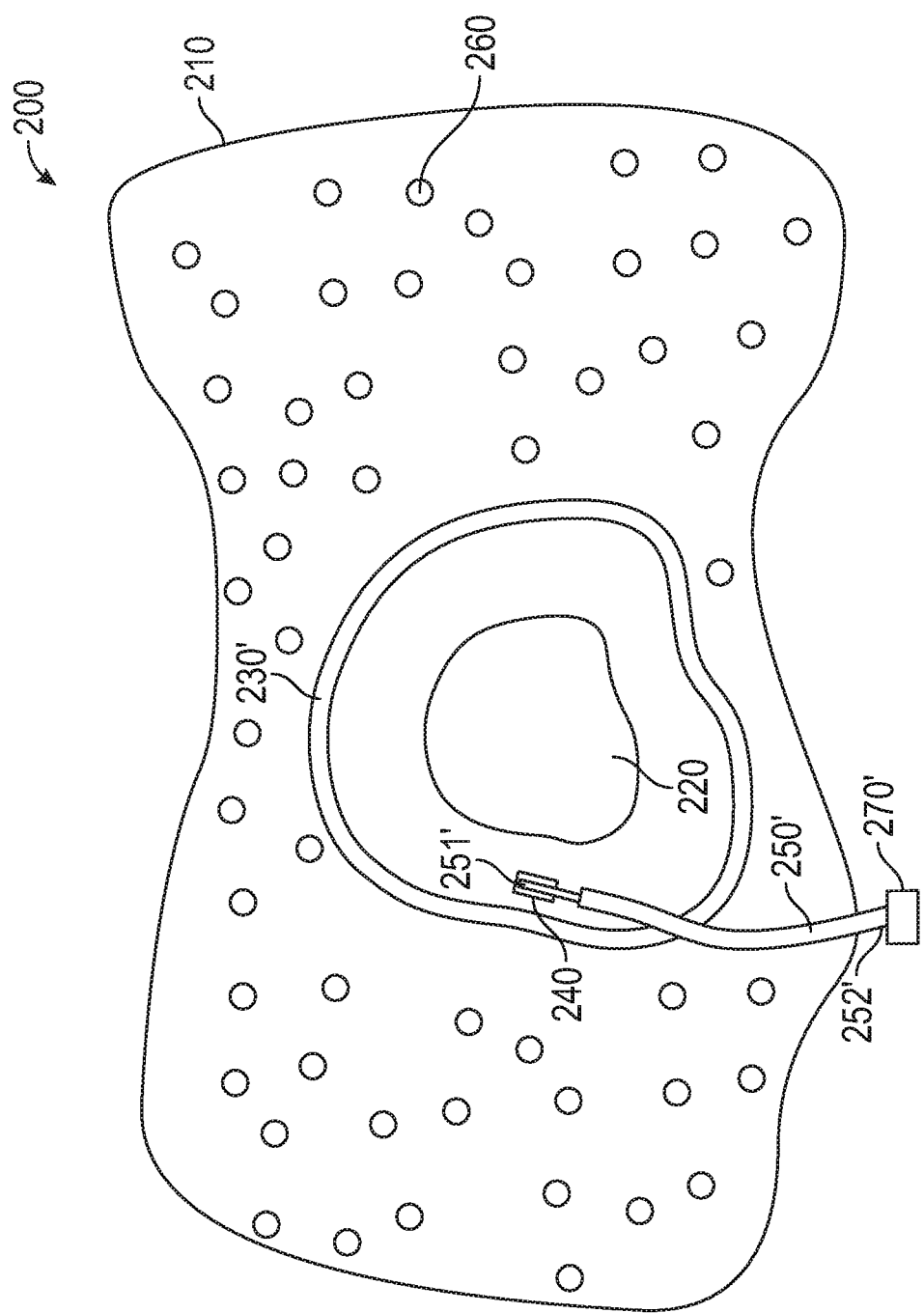
FIGS. 6-8 are schematic top views of optical system 200 having a closed loop channel according to three embodiments of the present disclosure.

As shown in FIG. 6, lightguide 210 may include a second channel 240 between opening 220 and first channel 230' for receiving at least first end 251' of optical fiber 250'. Optical fiber 250' extends between opposite first and second ends 251' and 252'. Light source 270' may be disposed proximate second fiber end 252'. Second channel 240 provides a mechanism to provide light from optical fiber 250' into the interior of lightguide 210.

As shown in FIGS. 3 and 4, second channel 240 may be formed in top major surface 211 and extend toward bottom major surface 212. As shown in FIG. 5, second channel 240 may be formed in bottom major surface 212 and extend toward top major surface 211.

Figure 7:
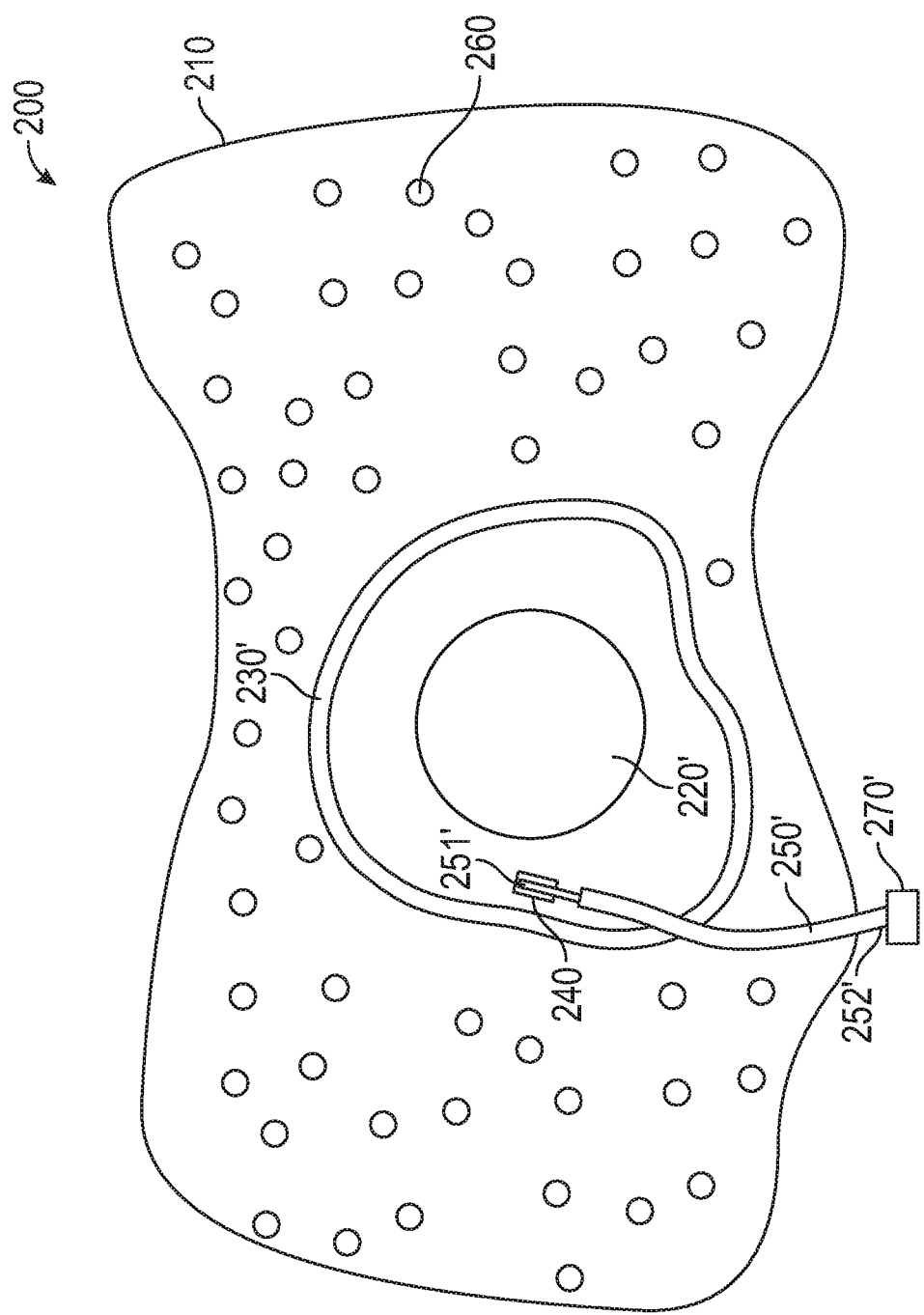

As shown in FIG. 7, round through opening 220' may be substantially circular.

Figure 8:
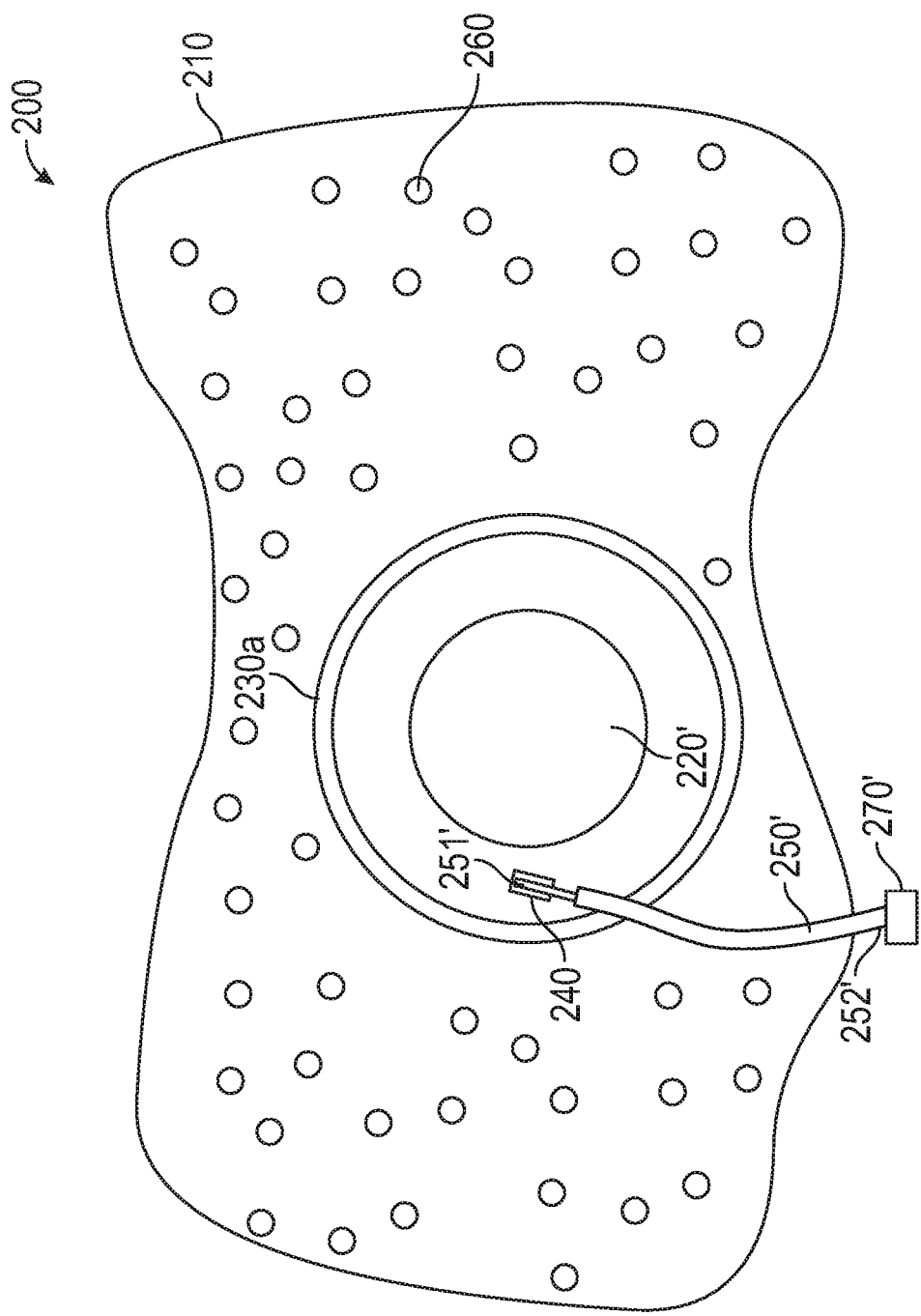

As shown in FIG. 8, first channel 230a may be substantially circular.

Figure 9:
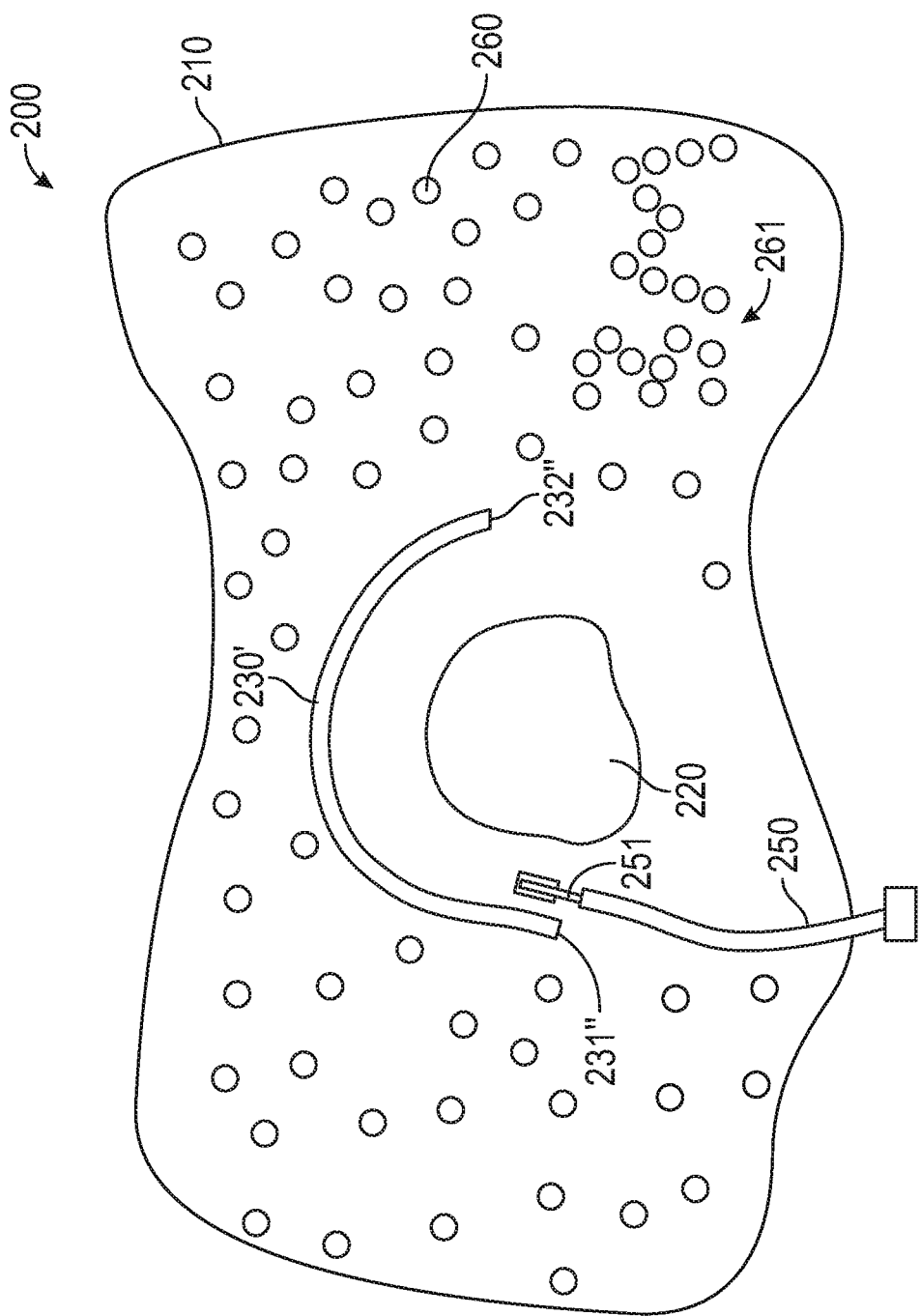
FIG. 9 is a schematic top view of optical system 200 having an open loop channel according to another embodiment of the present disclosure.

As shown in FIG. 9, first channel 230' may be an open loop channel having opposite first (231") and second (232") closed ends 231" and 232".

Figure 10:
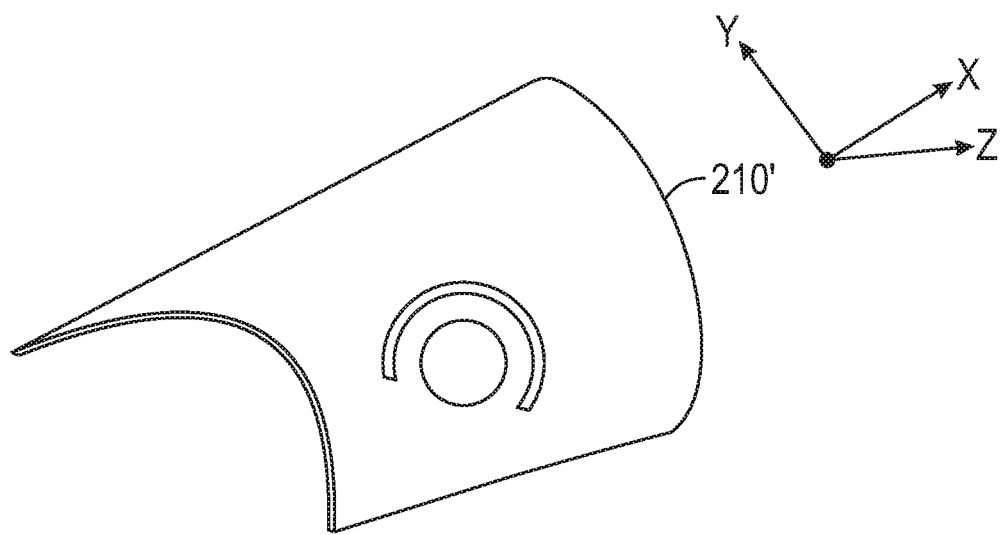
FIG. 10 is a schematic perspective view of lightguide 210' according to another embodiment of the present disclosure.

As shown in FIG. 10, lightguide 210' may be curved in at least one direction (y).

Figure 11A:
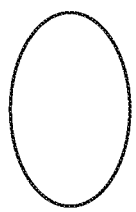
FIGS. 11 A-G are schematic cross-sectional views of lightguide 210 taken perpendicular to the length of the lightguide according to various embodiments of the present disclosure.
Figure 11B:
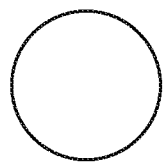
Figure 11C:
Figure 11D:
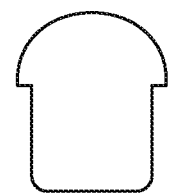
Figure 11E:
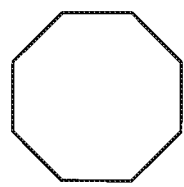
Figure 11F:
Figure 11G:

FIGS. 11A-G show various cross-sectional profiles of lightguide 210 perpendicular to the length of the lightguide. FIG. 11A shows a round cross-sectional profile. FIG. 11B shows a circular cross-sectional profile. FIG. 11C shows an elliptical cross-sectional profile. FIG. 11D shows a mushroom-shaped cross-sectional profile. FIG. 11E shows a polygonal cross-sectional profile. FIG. 11F shows a rectangular cross-sectional profile. FIG. 11G shows a square cross-sectional profile. Lightguide 210 may be substantially flat along its length or may be curved in at least one direction. Other geometries and cross-sectional profiles are possible provided they support total internal reflection within lightguide 210 as needed.

Figure 12A:
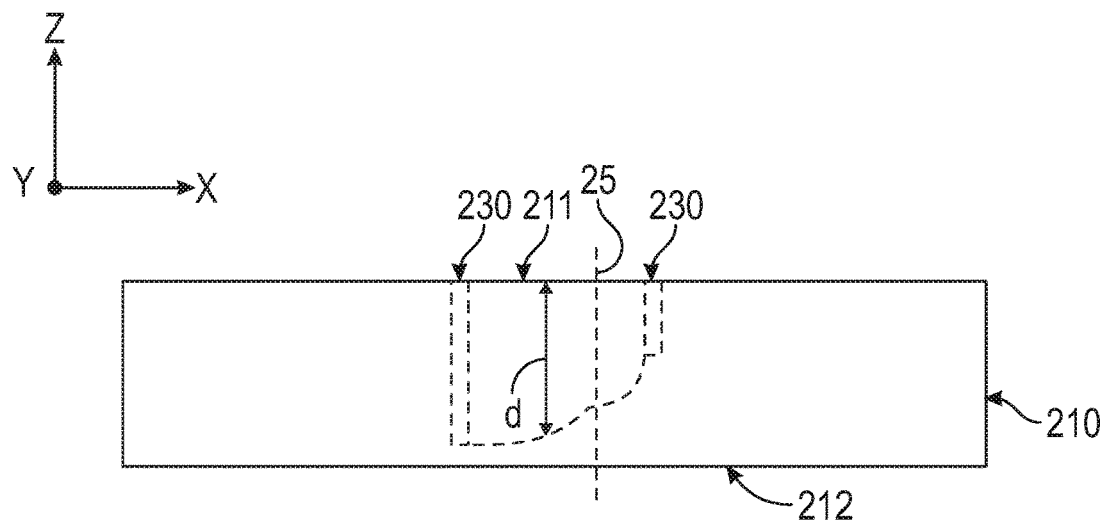
FIGS. 12 A-D are schematic side views of lightguide 210 showing the depth profile of channel 230 according to various embodiments of the present disclosure.

FIG. 12A shows a schematic side view of lightguide 210. First channel 230 (shown in dashed lines) is open to top surface 211, and extends to a depth d toward bottom surface 212. Vertical line 25 represents one location along the length of the first channel, and may be moved from left to right as shown in FIG. 12A at various locations along the length of first channel 230. As shown in FIG. 12A, depth d of first channel 230 may have a profile that changes in a piece-wise non-linear fashion, such as piece-wise adjoining curved surfaces, along at least a portion of the length of the channel.

Figure 12B:
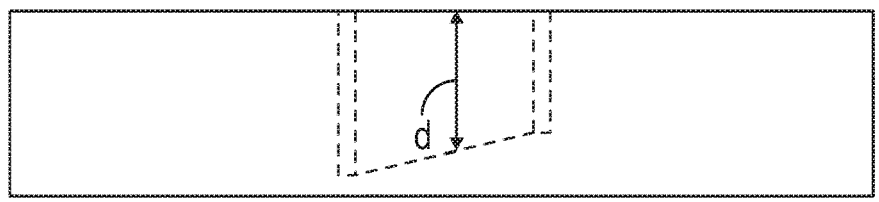
Figure 12C:
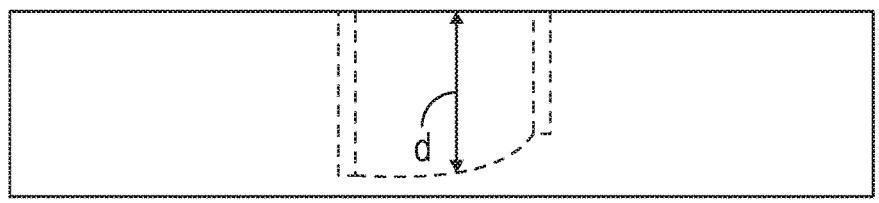
Figure 12D:
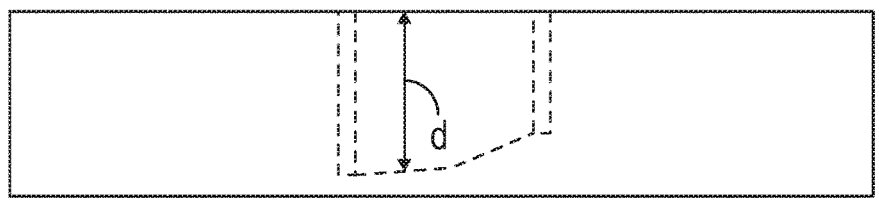

FIG. 12B shows first channel 230 having a depth d that varies along the length of at least a portion of the length of the channel in a linear fashion. FIG. 12C shows first channel 230 having a depth d having a curved, non-linear depth profile along at least a portion of its length. FIG. 12D shows first channel 230 having a depth d having a depth profile that is piece-wise and linear along at least a portion of its length.

A lightguide 300 including substantially coextensive spaced apart first 310 and second 320 elongated channels according to another embodiment of the present disclosure is shown in FIG. 13. Each elongated channel 310 and 320 extends from a first end (311, 321) of the channel proximate a same first edge 301 of lightguide 300 to an opposing second end (312, 322) of the channel proximate a same second edge 302 of the lightguide.

The pair of first and second channels 310 and 320 defines a first region 307 of lightguide 300 between the channels and a second region 308 of the lightguide outside of the first region. When light source 370 is disposed at first edge 301 between first and second channels 310 and 320, light 371 emitted by the light source enters first region 307 from the first edge, and at least a first portion 374 of light 371 undergoes at least partial reflection at at least one of the two channels, and at least a second portion 373 of light 371 propagates from the first region to second region 308 by crossing underneath or above one of the two channels.

Lightguide 300 may further include a plurality of light extractors 360 for extracting light that would otherwise propagate within and along the lightguide. At least some of light extractors 360 may form a pattern 361 that comprises one or more of a letter, a text, a logo, an alphanumeric, a symbol, a picture, and an image. Light extractors 360 may generally be only in second region 308.

As shown in FIG. 13, optical system 400 may further include a second light source 372 disposed at second edge 302 between channels 310 and 320. When second light source 372 is so disposed, light 371' emitted by the light source enters first region 307 from second edge 302, and at least a portion 373' of light 371' propagates from the first region to second region 308 by crossing underneath or above one of the two channels.

As shown in FIG. 13, first channel 310 may have open ends 311 and 312 while second channel 320 may have closed ends 321 and 322. First end 311 of first channel 310 and first end 321 of second channel 320 are on first side 305 of lightguide 300. Second end 312 of first channel 310 and second end 322 of second channel 320 are on second side 306 opposite first side 305. Thus, one channel may have open ends while the other has closed ends.

Figure 14:
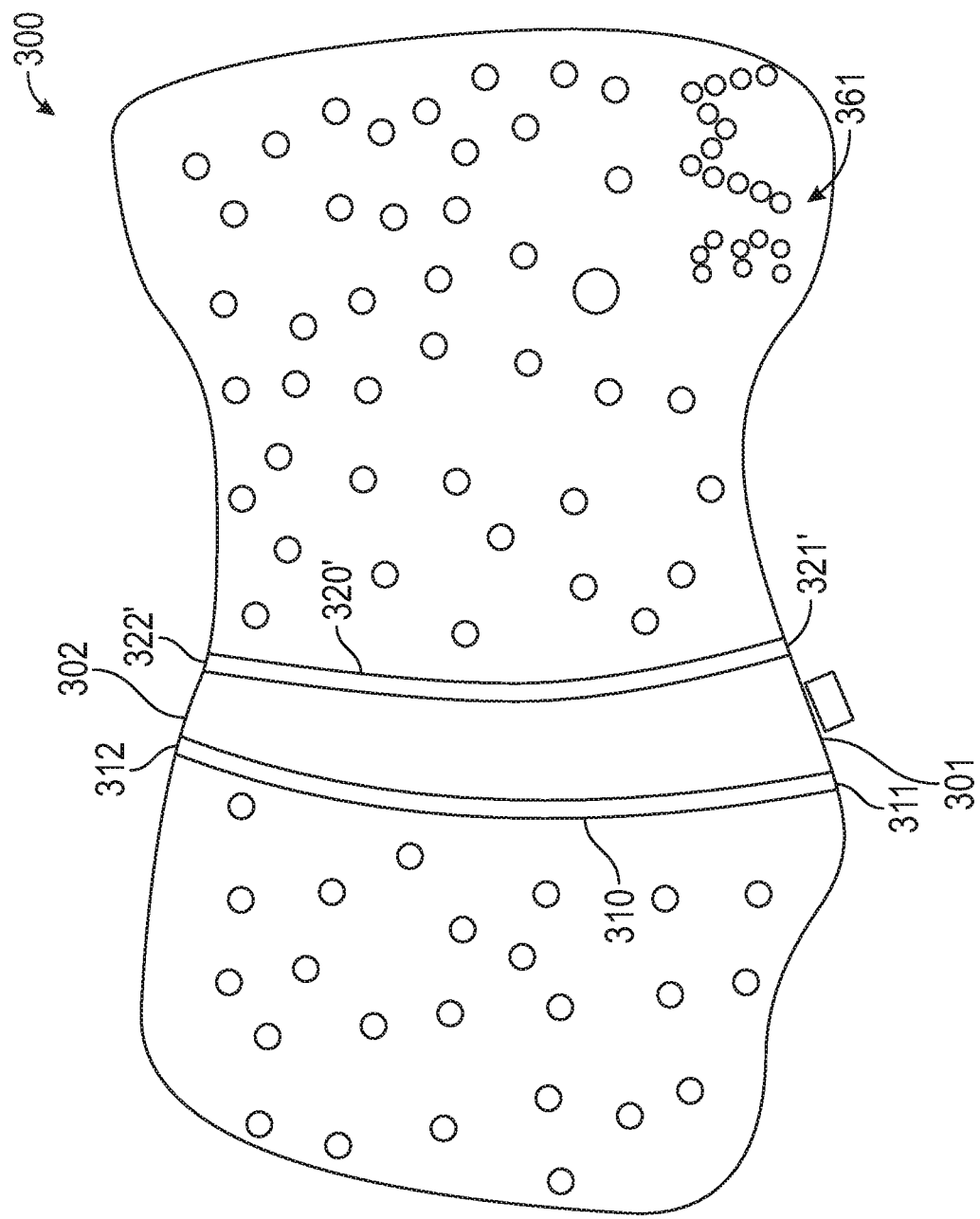

Another embodiment of the present disclosure is shown in FIG. 14. First channel 310 is the same as described with respect to FIG. 13, and has the same open ends 311 and 312. However, second channel 320' differs from second channel 320 of FIG. 13 in that ends of 321' and 322' of second channel 320' are open. Thus, both channels may have open ends.

Figure 15:
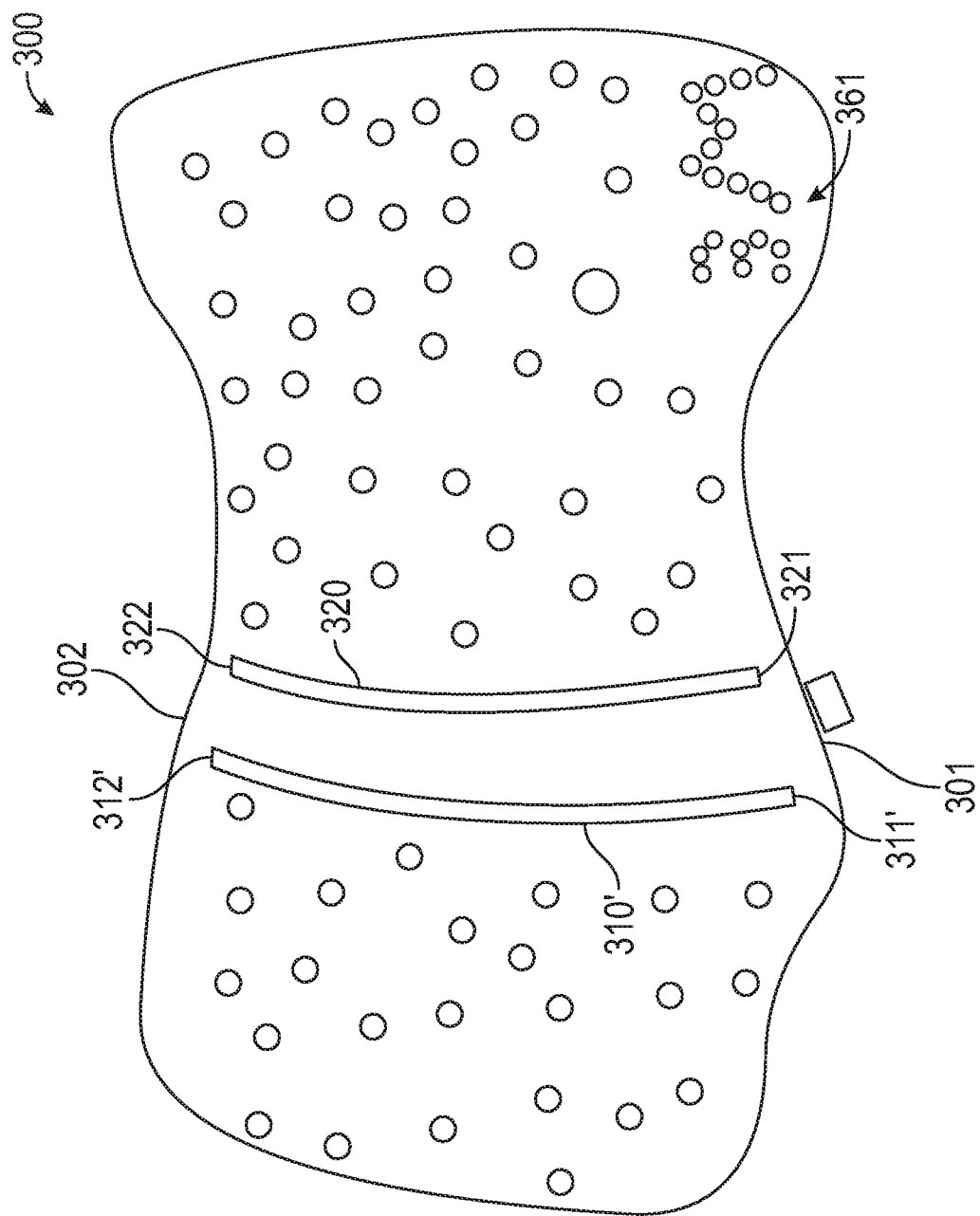

Another embodiment of the present disclosure is shown in FIG. 15. Second channel 320 is the same as described with respect to FIG. 13, and has the same closed ends 321 and 322. However, first channel 310' differs from first channel 310 of FIG. 13 in that ends 311' and 312' of the first channel 310' are closed. Thus, both channels may have closed ends.

As illustrated throughout this specification, any of the ends of the first and second channels (310, 310', 320, 320') of FIGS. 13-15 may be open or closed.

Figure 16A:
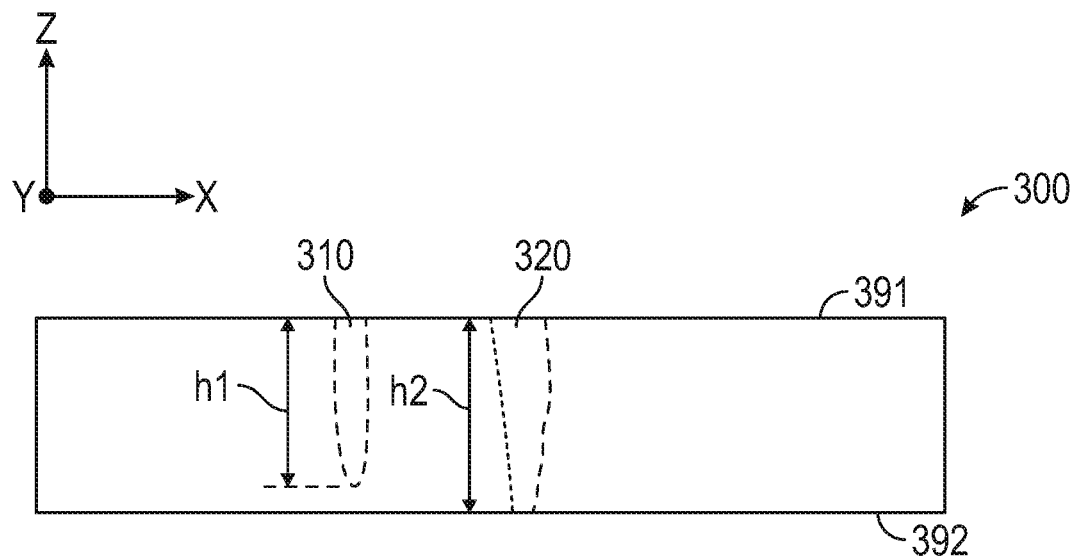
FIGS. 16 A-B are schematic side views of lightguide 300 showing the heights of the two spaced apart elongate channels according to two embodiments of the present disclosure.
Figure 16B:
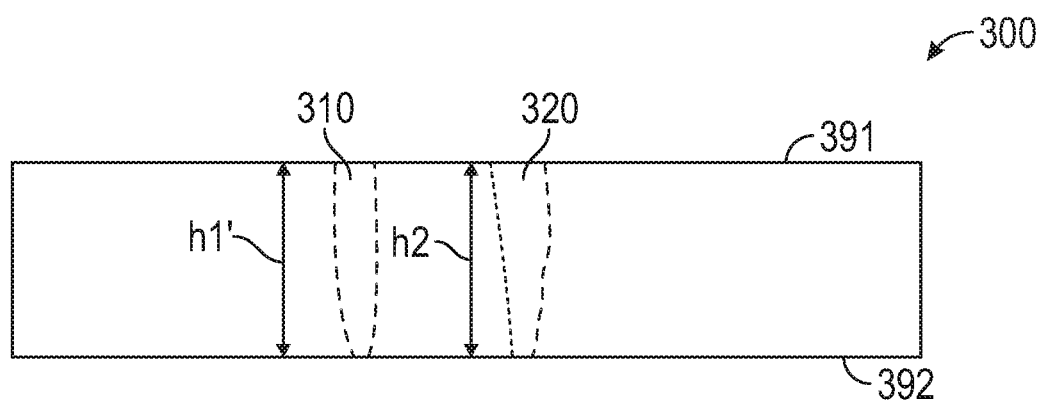

As shown in FIGS. 16A and 16B, first and second channels 310 and 320 have maximum depths h1 and h2, respectively. (Although this is described here with respect to channels 310 and 320, the same description also applies to channels 310' and 320'.) Maximum depths h1 and h2 may be greater than 0.5 times the thickness of lightguide 300. As shown in FIG. 16A, maximum depth h1 of first channel 310 extends from first major surface 391 of lightguide 300 through more than half of the thickness of the lightguide but does not extend all the way to second major surface 392, while maximum depth h2 of second channel 320 extends all the way from the first major surface to the opposing second major surface 392 of the lightguide. As shown in FIG. 16B, both maximum depth h1' of first channel 310 and maximum depth h2 of second channel 320 may extend all the way from first major surface 391 of lightguide 300 to second major surface 392 of the lightguide.

Figure 17:
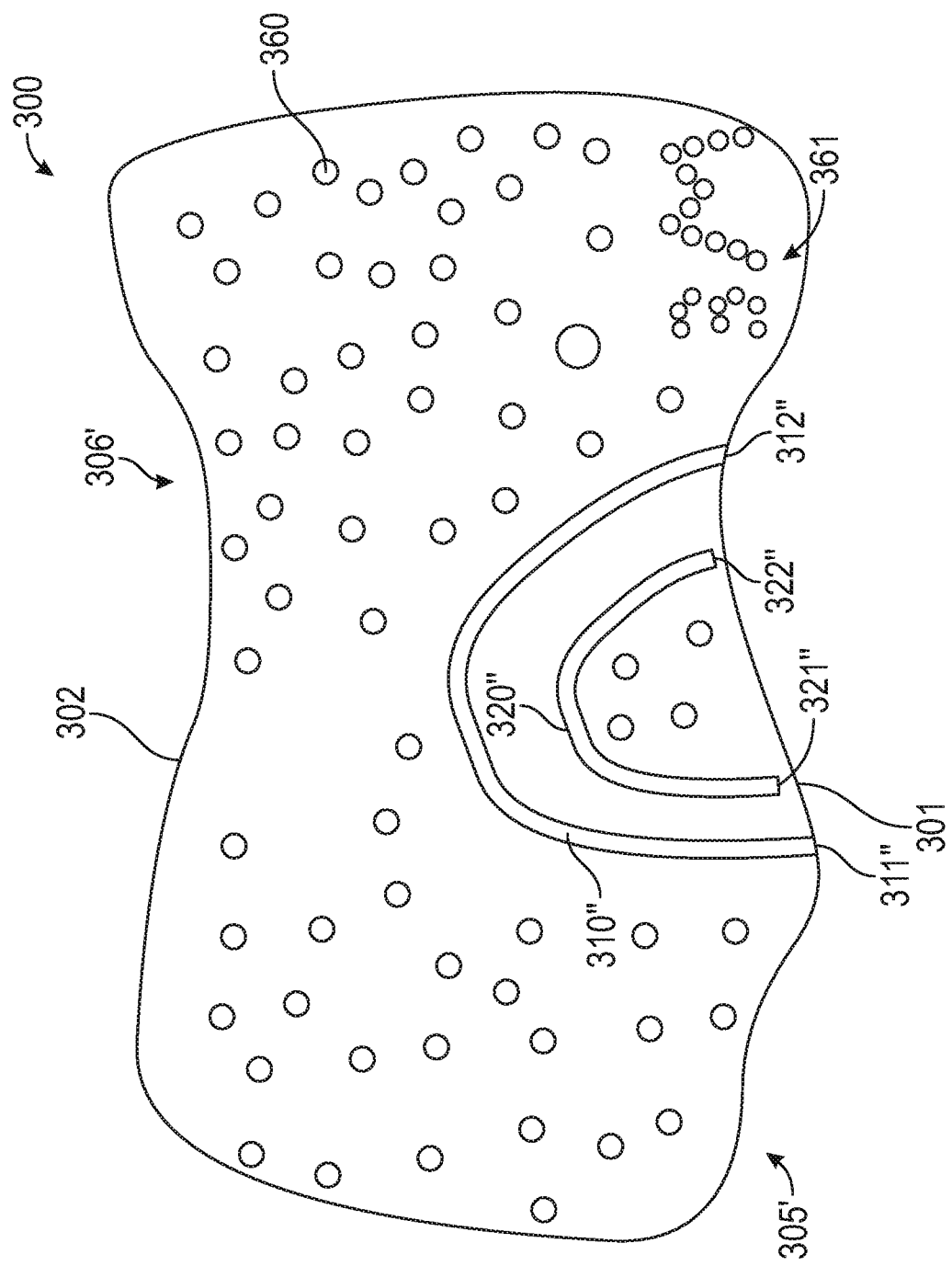
FIG. 17 is a schematic top view of lightguide 300 having two spaced apart channels where the ends of all the channels are on the same side of the lightguide according to another embodiment of the present disclosure.

An embodiment where the ends of each of the two channels are all located at the same side of the lightguide is shown in FIG. 17. Lightguide 300 has first and second channels 310" and 320". First channel 310" has a first end 311" and a second end 312", both of which are on the same side 305' of lightguide 300. Second channel 320" has a first end 321" and a second end 322", both of which are also on the same side 305'. Therefore, all four ends are closer to side 305' and edge 301 of lightguide 300 than opposite side 306' and edge 302. As shown in FIG. 17, both ends 311" and 312" of first channel 310" are open, whereas both ends 321" and 322" of second channel 320" are closed. Other combinations of open and closed ends for the two channels are possible.

Lightguides 210 and 300 (including the embodiments shown in FIGS. 11 A-G) can be made from a glass or a polymer, for example. In some embodiments, the lightguide is flexible. For example, a flexible polymer film may be used to form the lightguide. Suitable polymeric materials include acrylates such as polymethyl methacrylate (PMMA), polycarbonate, and polyurethane, for example. The lightguide can be made by first forming the lightguide (e.g., via extrusion or molding) without through opening 220, the first and second channels, or light extractors 360, and then creating these features through subsequent processing. These features can be formed by etching, laser ablation, or embossing, for example. Additional processing steps can be applied before or after the features are formed in the lightguide. Alternatively, the lightguide may be made simultaneously with the features in a molding process.

The present invention has several advantages over existing lightguides. For example, often lightguides require multiple LEDs to provide sufficient light and uniform illumination. The use of the elongate recesses described herein provide a mechanism for distributing the light from the LED enabling the use of a single LED rather than two or more LEDs. Also, often the LEDs are located at one end of the lightguide. The use of the recesses described herein allows for a configuration where the LED is on the side of the lightguide rather than at the end, which may be desirable depending on the space limitations or other constraints on the size and shape of the lightguide.

The inclusion of the through opening and the channels in the lightguide also provides an additional degrees of design flexibility for light management within the lightguide beyond that provided by light extractors 360. As discussed above, this may be done by including the channels described herein, and by selecting various characteristics for each of channel, including its length, its width, its depth, the manner in which the depth varies, the shape of the sides of the channels (curved or straight and the angle of the sides), the spacing between one channel and the other or the through opening, whether the channels have open or closed ends, the distance from a closed end of a channel to the closest edge of the lightguide, etc. Similarly, the size, shape, and location of through opening 220 in the lightguide can be selected to provide greater design flexibility.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that may vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The following are a list of embodiments of the present disclosure.

Embodiment 1 is an optical system, comprising: a lightguide comprising: opposing top and bottom major surfaces; a round through opening extending from the top major surface to the bottom major surface; an elongated first channel formed in one of the top and bottom major surfaces and at least partially surrounding and substantially concentric with the opening, the first channel having a depth (d) that varies along a length of the first channel; and a plurality of light extractors for extracting light that would otherwise propagate within and along the lightguide.

Embodiment 2 is the optical system of embodiment 1, wherein the round through opening is substantially circular.

Embodiment 3 is the optical system of embodiment 1, wherein the elongated first channel is a closed loop channel.

Embodiment 4 is the optical system of embodiment 1, wherein the elongated first channel is an open loop channel.

Embodiment 5 is the optical system of embodiment 1, wherein the elongated first channel comprises opposite first and second channel ends, at least one of which is open.

Embodiment 6 is the optical system of embodiment 1, wherein the elongated first channel comprises opposite first and second channel ends, both of which are open.

Embodiment 7 is the optical system of embodiment 1, wherein the elongated first channel comprises opposite first and second channel ends, at least one of which is closed.

Embodiment 8 is the optical system of embodiment 1, wherein the elongated first channel comprises opposite first and second channel ends, both of which are closed.

Embodiment 9 is the optical system of embodiment 1, wherein the elongated first channel extends between opposite closed first and closed second channel ends.

Embodiment 10 is the optical system of embodiment 1, wherein no light extractor in the plurality of light extractors is disposed between the opening and first channel.

Embodiment 11 is the optical system of embodiment 1, further comprising an optical fiber for injecting light into a region of the lightguide between the first opening and the elongated first channel, wherein a first end of the optical fiber is disposed at an edge of the lightguide proximate a first end of the elongated first channel.

Embodiment 12 is the optical system of embodiment 11, further comprising a light source for injecting light into the optical fiber and disposed proximate a second end of the optical fiber opposite the first end of the optical fiber.

Embodiment 13 is the optical system of embodiment 1, further comprising a second channel formed in a major surface of the lightguide between the opening and the first channel for receiving at least an end of an optical fiber.

Embodiment 14 is the optical system of embodiment 13, further comprising: an optical fiber extending between opposite first and second fiber ends, the first fiber end disposed in the second channel; and a light source disposed proximate the second fiber end.

Embodiment 15 is the optical system of embodiment 1, wherein the lightguide is substantially flat.

Embodiment 16 is the optical system of embodiment 1, wherein the lightguide is curved in at least one direction (y).

Embodiment 17 is the optical system of embodiment 1, wherein the lightguide has a round cross-sectional profile along a length of the lightguide.

Embodiment 18 is the optical system of embodiment 1, wherein the lightguide has a circular cross-sectional profile along a length of the lightguide.

Embodiment 19 is the optical system of embodiment 1, wherein the lightguide has an elliptical cross-sectional profile along a length of the lightguide.

Embodiment 20 is the optical system of embodiment 1, wherein the lightguide has a mushroom-shaped cross-sectional profile along a length of the lightguide.

Embodiment 21 is the optical system of embodiment 1, wherein the lightguide has a polygonal cross-sectional profile along a length of the lightguide.

Embodiment 22 is the optical system of embodiment 1, wherein the lightguide has a rectangular cross-sectional profile along a length of the lightguide.

Embodiment 23 is the optical system of embodiment 1, wherein the lightguide has a square cross-sectional profile along a length of the lightguide.

Embodiment 24 is the optical system of embodiment 1, wherein at least some of the light extractors in the plurality of light extractors form a pattern that comprises one or more of a letter, a text, a logo, an alphanumeric, a symbol, a picture, and an image.

Embodiment 25 is the optical system of embodiment 1, wherein at least some of the light extractors in the plurality of light extractors are protrusions formed on an exterior surface of the lightguide.

Embodiment 26 is the optical system of embodiment 1, wherein at least some of the light extractors in the plurality of light extractors are notches formed in an exterior surface of the lightguide.

Embodiment 27 is the optical system of embodiment 1, wherein the elongated first channel is formed in the top major surface and extends toward the bottom major surface, and wherein at least one location along the length of the elongated first channel, the elongated first channel reaches the bottom major surface.

Embodiment 28 is the optical system of embodiment 1, wherein the elongated first channel is formed in the top major surface and extends toward the bottom major surface.

Embodiment 29 is the optical system of embodiment 1, wherein the elongated first channel is formed in the bottom major surface and extends toward the top major surface.

Embodiment 30 is the optical system of embodiment 1, wherein top major surface is an emission surface of the lightguide, light propagating within and along the lightguide and extracted by a light extractor in the plurality of light extractors exiting the lightguide from the emission surface.

Embodiment 31 is the optical system of embodiment 1, wherein the elongated first channel has a first side surface facing the opening and an opposing second side surface facing away from the opening, at least one of the first and second side surfaces making an angle with a normal to the lightguide that is less than about 30 degrees.

Embodiment 32 is the optical system of embodiment 1, wherein the elongated first channel has a first side surface facing the opening and an opposing second side surface facing away from the opening, at least one of the first and second side surfaces making an angle with a normal to the lightguide that is less than about 20 degrees.

Embodiment 33 is the optical system of embodiment 1, wherein the elongated first channel has a first side surface facing the opening and an opposing second side surface facing away from the opening, at least one of the first and second side surfaces being substantially planar.

Embodiment 34 is the optical system of embodiment 1, wherein the elongated first channel has a first side surface facing the opening and an opposing second side surface facing away from the opening, at least one of the first and second side surfaces being curved.

Embodiment 35 is the optical system of embodiment 1, wherein the elongated first channel is substantially circular.

Embodiment 36 is the optical system of embodiment 1, wherein the depth d varies linearly along at least a portion of the length of the elongated first channel.

Embodiment 37 is the optical system of embodiment 1, wherein the depth d varies nonlinearly along at least a portion of the length of the elongated first channel.

Embodiment 38 is the optical system of embodiment 1, wherein the depth d has a piece-wise linear profile along at least a portion of the length of the elongated first channel.

Embodiment 39 is the optical system of embodiment 1, wherein the depth d has a piece-wise nonlinear profile along at least a portion of the length of the elongated first channel.

Embodiment 40 is the optical system of embodiment 1, wherein the lightguide has an index of refraction n1 and the elongated first channel is at least partially filled with a filler material having an index of refraction index n2 less than n1.

Embodiment 41 is the optical system of embodiment 1, wherein the lightguide is a unitary lightguide.

Embodiment 42 is a lightguide comprising substantially coextensive spaced apart first and second elongated channels, each elongated channel extending from a first end of the elongated channel proximate a same first edge of the lightguide to an opposing second end of the elongated channel proximate a same second edge of the lightguide, wherein at least one of the first and second elongated channels has a maximum depth (h1, h2) that is at least 0.5 times a thickness of the lightguide.

Embodiment 43 is the lightguide of embodiment 42, wherein at least one end in the first and second ends of at least one of the first and second elongated channels is closed.

Embodiment 44 is the lightguide of embodiment 42, wherein at least one end in the first and second ends of at least one of the first and second elongated channels is open.

Embodiment 45 is the lightguide of embodiment 42, wherein at least one of the first and second elongated channels extends from the first edge to the second edge.

Embodiment 46 is the lightguide of embodiment 42, wherein each of the first and second elongated channels extends from the first edge to the second edge.

Embodiment 47 is the lightguide of embodiment 42, wherein neither of the first and second elongated channels extends from the first edge to the second edge.

Embodiment 48 is the lightguide of embodiment 42, wherein the first and second ends of at least one of the first and second elongated channels is open.

Embodiment 49 is the lightguide of embodiment 42, wherein the first and second ends of at least one of the first and second elongated channels is closed.

Embodiment 50 is the lightguide of embodiment 42, wherein one, but not the other, of the first and second elongated channels extends from a first major surface of the lightguide to an opposing second major surface of the lightguide.

Embodiment 51 is the lightguide of embodiment 42, wherein each of the first and second elongated channels has a maximum depth (h1', h2) that is at least 0.5 times a thickness of the lightguide.

Embodiment 52 is the lightguide of embodiment 42, wherein the first and second edges are on opposite sides of the lightguide.

Embodiment 53 is the lightguide of embodiment 42, wherein the first and second edges are on a same side of the lightguide.

Embodiment 54 is the lightguide of embodiment 42, further comprising a plurality of light extractors for extracting light that would otherwise propagate within and along the lightguide.

Embodiment 55 is the lightguide of embodiment 54, wherein at least some of the light extractors in the plurality of light extractors form a pattern that comprises one or more of a letter, a text, a logo, an alphanumeric, a symbol, a picture, and an image.

Embodiment 56 is the lightguide of embodiment 42, wherein the pair of the first and second elongated channels define a first region of the lightguide between the first and second elongated channels and a second region of the lightguide on at least one side of the pair of the first and second elongated channels, such that when a light source is disposed at one of the first and second edges between the first and second elongated channels, light emitted by the light source enters the first region from the one of the first and second edges, at least a first portion of the entered light propagating toward the other one of the first and second edges by undergoing at least partial reflection at at least one of the first and second elongated channels, and at least a second portion of the entered light propagating from the first region to the second region by crossing underneath or above one of the first and second elongated channels.

Embodiment 57 is the lightguide of embodiment 42, wherein the lightguide is a unitary lightguide.

Embodiment 58 is an optical system, comprising: the lightguide of embodiment 42, wherein the first and second elongated channels define a first region of the lightguide therebetween; and a light source disposed at at least one of the first and second edges between the first and second elongated channels, such that light emitted by the light source enters the first region of the lightguide and propagates along the first region by undergoing at least partial reflection at the first and second elongated channels.

Embodiment 59 is the optical system of embodiment 58, wherein a light source is disposed at each of the first and second edges between the first and second elongated channels, such that light emitted by each light source enters the first region of the lightguide and propagates along the first region by undergoing reflection at the first and second elongated channels.

Embodiment 60 is the lightguide of embodiment 58, wherein the lightguide is a unitary lightguide.

Various modifications and alterations of this invention will be apparent to those skilled in the art and it should be understood that this scope of this disclosure is not limited to the illustrative embodiments set forth herein. For example, the reader should assume that features of one disclosed embodiment may also be applied to all other disclosed embodiments unless otherwise indicated.

The invention claimed is:

1. An optical system, comprising:
   a lightguide comprising:
   opposing top and bottom major surfaces;
   a round through opening extending from the top major surface to the bottom major surface;
   an elongated first channel formed in one of the top and bottom major surfaces and at least partially surrounding and substantially concentric with the opening, the first channel having a depth (d) that varies along a length of the first channel; and
   a plurality of light extractors for extracting light that would otherwise propagate within and along the lightguide.

2. The optical system of claim 1, further comprising an optical fiber for injecting light into a region of the lightguide between the round through opening and the elongated first channel, wherein a first end of the optical fiber is disposed at an edge of the lightguide proximate a first end of the elongated first channel.

3. The optical system of claim 1, wherein the elongated first channel is formed in the top major surface and extends toward the bottom major surface, and wherein at at least one location along the length of the elongated first channel, the elongated first channel reaches the bottom major surface.

4. A lightguide comprising opposing top and bottom major surfaces and substantially coextensive spaced apart first and second elongated channels formed in one of the top and bottom major surfaces; and a plurality of light extractors formed in one of the top and bottom major surfaces and spaced apart from the first and second elongated channels for extracting light that would otherwise propagate within and along the lightguide, each elongated channel extending from a first end of the elongated channel proximate a same first edge of the lightguide to an opposing second end of the elongated channel proximate a same second edge of the lightguide, wherein at least one of the first and second elongated channels has a maximum depth (h1, h2) that is at least 0.5 times a thickness of the lightguide, and wherein at least one of the first and second elongated channels has a depth that varies along at least a portion of a length of the channel.

5. The lightguide of claim 4, wherein at least one end in the first and second ends of at least one of the first and second elongated channels is closed.

6. The lightguide of claim 4, wherein neither of the first and second elongated channels extends from the first edge to the second edge.

7. The lightguide of claim 4, wherein the pair of the first and second elongated channels define a first region of the lightguide between the first and second elongated channels and a second region of the lightguide on at least one side of the pair of the first and second elongated channels, such that when a light source is disposed at one of the first and second edges between the first and second elongated channels, light emitted by the light source enters the first region from the one of the first and second edges, at least a first portion of the entered light propagating toward the other one of the first and second edges by undergoing at least partial reflection at at least one of the first and second elongated channels, and at least a second portion of the entered light propagating from the first region to the second region by crossing underneath or above one of the first and second elongated channels.

8. An optical system, comprising:
   the lightguide of claim 4, wherein the first and second elongated channels define a first region of the lightguide therebetween; and
   a light source disposed at at least one of the first and second edges between the first and second elongated channels, such that light emitted by the light source enters the first region of the lightguide and propagates along the first region by undergoing at least partial reflection at the first and second elongated channels.

9. The optical system of claim 8, wherein a light source is disposed at each of the first and second edges between the first and second elongated channels, such that light emitted by each light source enters the first region of the lightguide and propagates along the first region by undergoing reflection at the first and second elongated channels.

10. The lightguide of claim 8, wherein the lightguide is a unitary lightguide.

\* \* \* \* \*